United States Patent
Wagner

(10) Patent No.: US 7,219,965 B2
(45) Date of Patent: May 22, 2007

(54) LINKED BRAKE SYSTEM FOR MOTORCYCLES

(75) Inventor: Hans-Albert Wagner, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 11/055,074

(22) Filed: Feb. 11, 2005

(65) Prior Publication Data

US 2005/0146207 A1    Jul. 7, 2005

Related U.S. Application Data

(63) Continuation of application No. PCT/EP03/008458, filed on Jul. 31, 2003.

(30) Foreign Application Priority Data

Aug. 13, 2002   (DE)   ................ 102 37 102

(51) Int. Cl.
*B60T 13/00*   (2006.01)
(52) U.S. Cl. ............................ 303/9.64; 303/137
(58) Field of Classification Search ............. 303/9.62, 303/9.64, 9.61, 9.65, 137
See application file for complete search history.

(56) References Cited

U.S. PATENT DOCUMENTS

| | | | |
|---|---|---|---|
| 4,440,452 A | | 4/1984 | Burckhardt |
| 4,626,042 A | * | 12/1986 | Burckhardt ............... 303/186 |
| 5,246,276 A | | 9/1993 | Pajonk et al. |
| 5,273,346 A | * | 12/1993 | Tsuchida et al. ............ 303/2 |
| 5,324,102 A | * | 6/1994 | Roll et al. ................ 303/137 |
| 5,344,220 A | * | 9/1994 | Roll et al. ............... 303/9.64 |
| 5,372,408 A | | 12/1994 | Tsuchida et al. |
| 5,386,366 A | * | 1/1995 | Roll et al. ................ 701/70 |

(Continued)

FOREIGN PATENT DOCUMENTS

| | | |
|---|---|---|
| DE | 38 03 563 A1 | 8/1989 |
| DE | 39 01 923 A1 | 9/1990 |
| DE | 692 15 274 T2 | 3/1997 |

(Continued)

OTHER PUBLICATIONS

International Search Report.
German Office Action.

*Primary Examiner*—Devon Kramer
(74) *Attorney, Agent, or Firm*—Crowell & Moring LLP

(57) ABSTRACT

A linked brake system for motorcycles includes front and rear wheel brakes, an actuating device by which the front and rear wheel brakes can be operated simultaneously, a control system for controlling brake pressures at the front and rear wheel brakes, and wheel rotational speed sensors for measuring the wheel rotational speeds of the front and rear wheels as well as for determining a reference deceleration approaching the actual vehicle deceleration and for detecting running conditions in which a lock-up tendency exists at at least one of the front wheel and the rear wheel. The wheel rotational speed sensors is connected to the control system. Upon an operation of the actuating device, the control system operates the front and rear wheel brakes with a set brake pressure ratio, provided the reference deceleration is less than a set deceleration. The control system controls the brake pressure ratio according to an ideal braking force distribution function between the front wheel and rear wheel whenever the reference deceleration exceeds a set critical deceleration.

8 Claims, 2 Drawing Sheets

U.S. PATENT DOCUMENTS

| | | |
|---|---|---|
| 5,445,443 A * | 8/1995 | Hauser et al. ............... 303/137 |
| 5,620,237 A * | 4/1997 | Iwashita et al. ........... 303/9.64 |
| 6,309,029 B1 * | 10/2001 | Wakabayashi et al. ..... 303/9.64 |
| 6,354,676 B1 | 3/2002 | Oshiro |
| 6,409,285 B1 * | 6/2002 | Wakabayashi et al. ..... 303/9.64 |
| 6,557,949 B2 * | 5/2003 | Tani et al. ................. 303/9.64 |
| 6,793,295 B2 * | 9/2004 | Sakamoto ................. 303/9.64 |

FOREIGN PATENT DOCUMENTS

| | | |
|---|---|---|
| DE | 693 12 530 T2 | 12/1997 |
| DE | 198 58 376 A1 | 6/1999 |
| EP | 559 224 A2 | 9/1993 |
| EP | 0 687 621 A2 | 12/1995 |
| EP | 0 559 224 B1 | 7/1997 |
| EP | 1277635 * | 1/2003 |
| WO | WO 02/22417 A1 | 3/2002 |

* cited by examiner

LINKED BRAKE SYSTEM FOR MOTORCYCLES

CROSS REFERENCE TO RELATED APPLICATIONS

This application is a continuation of International Patent Application No. PCT/EP2003/008458, filed Jul. 31, 2003, designating the United States of America, and published in German as WO 2004/022395 A1, the entire disclosure of which is incorporated herein by reference. Priority is claimed based on German Patent Application No. 102 37 102.4, filed Aug. 13, 2002.

FIELD AND SUMMARY OF THE INVENTION

The present invention relates to a linked brake system for motorcycles.

The term, "linked brake system," in connection with motorcycles is understood to mean a brake system in which, when a "hand brake lever" or the "foot brake lever" is operated, the front wheel brake and the rear wheel brake are applied. Thus, by operating a single actuating device, both brakes are applied. Combinations are also possible wherein one brake lever acts on one wheel and the other brake lever on both wheels.

One linked brake system for motorcycles is disclosed, for example, in DE 38 03 563 A1. In this brake system, when the foot brake lever is operated braking pressure is applied simultaneously to the front wheel brake and the rear wheel brake. Furthermore, an additional front wheel brake is provided to which braking pressure is applied by operating the hand brake lever. The additional front wheel brake can be operated independently of the operation of the foot brake lever. When the additional front wheel brake is operated, an additional change in the wheel loading takes place. In order to prevent the rear wheel from locking up when the hand brake lever is operated, a brake force regulator is provided which accordingly limits the brake pressure at the rear wheel brake.

In Bosch, "Kraftfahrtechnisches Taschenbuch," 24$^{th}$ ed., page 717, a passenger car brake system is described in which the braking force is divided in a permanently predetermined ratio between the front axle and the rear axle. A braking force distribution diagram is shown for the front axle and the rear axle, in which the "ideal" braking force distribution can be seen. The term, "ideal braking force distribution," is to be understood to mean a braking force distribution which is adapted according to the dynamic axle load distribution.

Basically, it would be desirable during every braking action to set the braking force distribution between the front axle and the rear axle for the ideal braking force distribution. Thus, an optimum braking action would be achieved on the one hand. On the other hand, overbraking and thus excessive tire wear as well as a loss of driving stability could be avoided due to the relieving of the rear axle which occurs in a brake action. An ideal braking force distribution in any "kind" of braking action, i.e., even in light, uncritical braking, is technically complicated to achieve. Furthermore, the applied braking pressure, front or back, must as a rule be more or less greatly reduced at the rear axle by a control valve according to the dynamic axial load distribution. This can lead, as in the case of an ABS action, to a chattering brake action, which is undesirable for reasons of comfort and driving stability, at least in light or uncritical braking.

It is the problem of the invention to create a linked brake apparatus for motorcycles, which offers good braking comfort and at the same time great braking reliability.

This problem is solved by the invention as described and claimed below.

The invention sets out from a linked brake system for motorcycles, that is to say, from a brake system in which, by the operation of a single actuating device, for example a foot brake lever or a hand brake lever, the front wheel brake and the rear wheel brake can be operated simultaneously. The linked brake system has a control device, such as an electrohydraulic control device, with which the brake pressures at the front wheel brake and at the rear wheel brake can be controlled. Wheel rotatory speed sensors are connected to the control device and measure the speeds and the wheel accelerations that can be derived therefrom. From the wheel rotational speeds, a reference speed approximating the actual vehicle speed can be determined, and from the wheel accelerations a reference deceleration can be determined, approximating the actual deceleration of the vehicle.

The basic principle of the invention includes dividing the overall braking force in a set ratio between the front wheel brake and the rear wheel brake, and only in "critical" braking situations dividing it according to the ideal braking force ratio.

In the technology of brake regulation, the so-called "braking force distribution diagram" is known, as described, for example, in Bosch, "Kraftfahrtechnisches Taschenbuch," 24$^{th}$ ed., page 717. In such a braking force distribution diagram, the braking force, standardized for the weight of the vehicle, is recorded at the front axle and at the rear axle. The ideal braking force distribution between the front axle and rear axle has a "paraboloid" shape in this diagram.

According to the invention, in uncritical braking situations, that is to say braking situations in which the braking force at the rear axle as well as the braking force at the front axle lie "below" the curve of the ideal braking force distribution, the braking force distribution is set according to the fixedly established, constant braking force ratio. The "range" in which the braking force distribution is constant is in the form of a straight line.

Beginning at the point at which the "straight line" intersects the paraboloid curve of the ideal braking force distribution, one speaks of a "critical braking situation." In critical braking situations the braking force distribution is no longer set according to the fixedly preset ratio, but is adjusted according to the curve of the ideal braking force distribution.

Provision is made in a further development of the invention so that, in the setting of the braking force distribution, the loading condition of the motorcycle is considered. The loading condition on the motorcycle affects the static axle loading and thus the static axle load distribution, which in turn leads to a variation of the dynamic axle load distribution. According to the particular loading of the motorcycle, there is in each case an associated curve for the ideal braking force distribution. Accordingly, different curves of the ideal braking force distribution for different loading conditions are recorded in the regulating system.

The loading condition of the motorcycle can either be measured directly, for example by force sensors or extensometers on the wheel suspensions, or indirectly by the braking or locking up of the wheels. Simply expressed, monitoring is performed according to the applied brake pressure to determine whether either of the two wheels is locking up. A conclusion can be drawn as to the loading condition of the motorcycle from the locking behavior in relation to the applied brake pressure. Preferably, the loading condition is permanently monitored and adapted if necessary, if the actual loading condition is changed or inapplicable or too inaccurately estimated.

BRIEF DESCRIPTION OF THE DRAWINGS

The invention is further explained hereinafter in connection with the drawing.

DETAILED DESCRIPTION OF THE DRAWINGS

Figure 1:
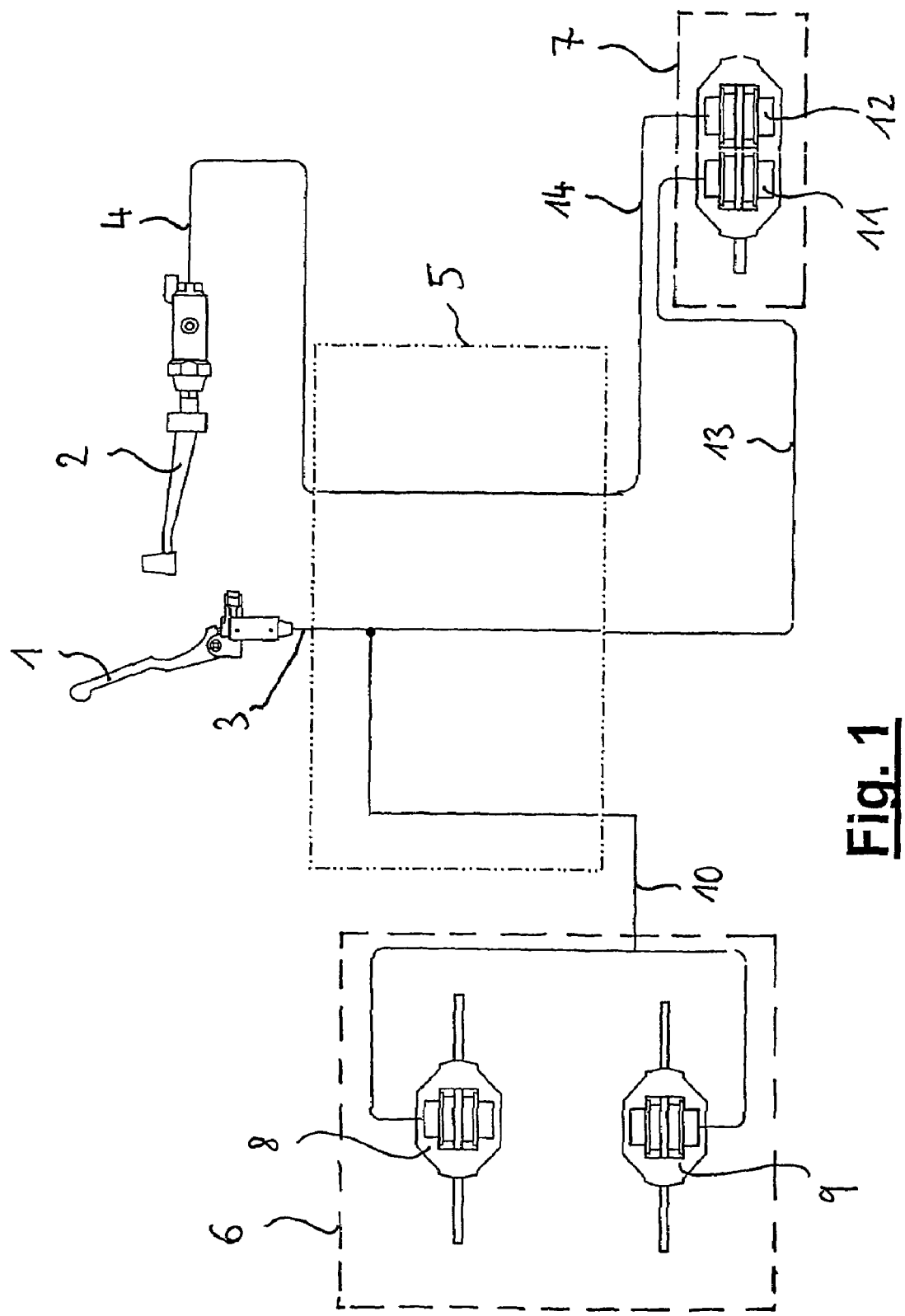
FIG. 1 shows the basic construction of a linked brake system for motorcycles.

FIG. 1 shows diagrammatically a linked brake system of a motorcycle. A first brake lever 1 and a second brake lever 2 are provided for brake operation. The first brake lever 1 can be, for example, a hand brake lever, and the second brake lever can be a foot brake lever, for example. The brake levers 1 and 2 are connected through associated leads 3 and 4 to a control system 5, here indicated only schematically. The control system 5 can be, for example, an electrohydraulic control unit with an integrated ABS (antilock brake system). The control system 5 operates and regulates both the division of the braking force between the front and rear axles, and by its ABS function limits the braking pressure at the particular wheel in the event of a locking tendency. The wheel speeds are measured by wheel rotational speed sensors. A reference speed approximating the actual vehicle velocity can be derived from the wheel speeds. Also, wheel retardation and a reference retardation approaching the actual vehicle retardation can be derived from the wheel speeds.

Furthermore, a front wheel brake 6 and a rear wheel brake 7 are represented diagrammatically. The front wheel brake 6 consists of two disk brake units 8 and 9 which can be operated through a common brake line 10. The rear wheel brake 7 has two brake units 11 and 12 here, each being operated through separate brake lines 13 and 14. The brake lines 10 and 13 can be operated in common through a brake lever 1. That is to say, by operating the first brake lever 1, both the front wheel brake 6 and the rear wheel brake 7 can be applied. The brake unit 12 of the rear wheel brake 7, however, is operable only by the second brake lever 2.

The control system 5, which is for example an electrohydraulic control system, controls and regulates, quite generally speaking, in accord with the running condition and with the braking condition, the distribution of the braking force to the front wheel brake 6 and the rear wheel brake 7, which will be explained in greater detail in connection with FIG. 2.

Figure 2:
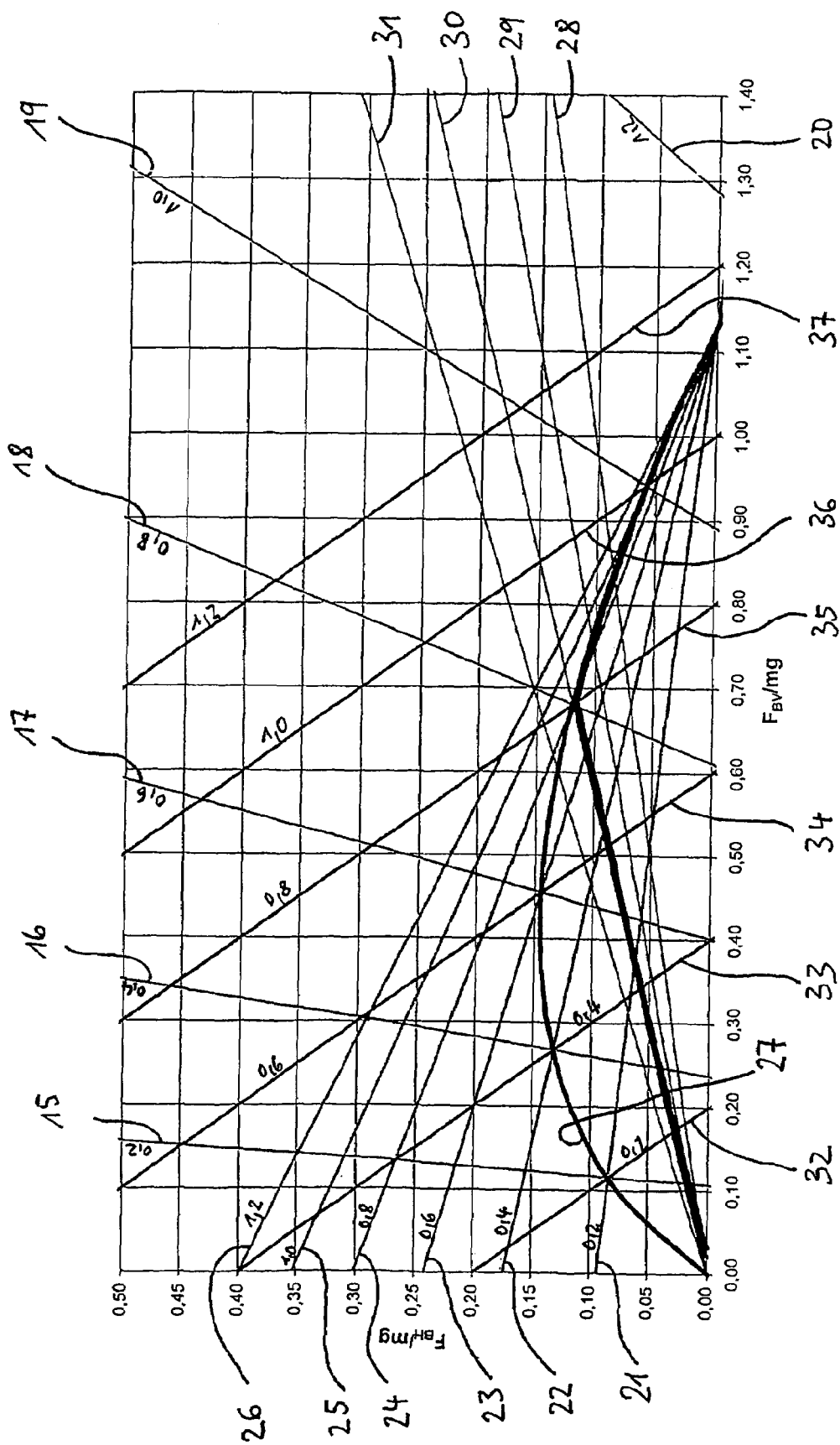
FIG. 2 a braking force distribution diagram to explain the invention.

FIG. 2 shows a braking force distribution diagram. The braking force on the front wheel $F_{BV}$ and on the rear wheel $F_{BH}$ are recorded without dimensions. The brake force on the front wheel $F_{BV}$ and the braking force on the rear wheel $F_{BH}$ are standardized and thus shown without dimension. The straight lines 15–20 are drawn for the front wheel, the straight lines representing geometrical loci of equal static coefficient of friction. The straight line 15, for example, represents a static coefficient of friction of 0.2 on the front wheel.

Likewise, straight lines 21–26 are recorded. Straight lines 21–26 represent geometrical locations of the same static coefficient of friction at the rear wheel. For example, the static coefficient of friction on the rear wheel on the straight line 23 is 0.6. The intersections of the straight lines with equal static coefficient of friction of front wheel and rear wheel result in the curve 27. Curve 27 gives the "ideal braking force distribution" between front axle and rear axle at a given vehicle loading. Curve 27 is of arcuate shape. That is, the ideal braking force distribution varies with the deceleration of the vehicle.

Also, straight lines 28–31 are shown. Straight lines 28–31 represent geometrical loci at which the braking force distribution to the front axle and the rear axle takes place according to a constant braking force ratio.

The braking force distribution diagram is finally completed by straight lines 32–37. Straight lines 32–37 represent geometrical loci of constant braking of the vehicle. For example, straight line 34 represents a vehicle deceleration of 0.6 g, g being the acceleration due to gravity.

It has already been mentioned that curve 27 is valid for a specific state of the loading of the vehicle. If the vehicle loading changes, both lines 15–19 and lines 21–26 shift, which consequently also results in a variation of the shape of curve 27, that is, it leads to the ideal braking force distribution. For reasons of clarity, however, only one of these curves 27 is drawn in FIG. 2. In the control system 5 (FIG. 1), however, an entire characteristic, that is, a set of such curves 27, is stored in memory for different loading conditions.

Now, the heart of the invention is to divide the braking force in uncritical braking situations according to a fixedly established ratio between the front axle and the rear axle. For example, a braking force distribution is selected corresponding to the slope of line 30. The term, "uncritical braking situation," is to be understood as a braking state which is "below" curve 27. Below curve 27, therefore, a constant braking force distribution is established corresponding to line 30. If a given vehicle deceleration is exceeded—here a vehicle deceleration of 0.8 g, which is represented by the straight line 35—the regulating strategy is changed.

That is, in the case of decelerations in which the "selected" straight line of constant deceleration intersects the idea braking force distribution, the braking force distribution is governed according to the shape of the ideal braking force distribution. Graphically speaking, the control curve breaks into the curve of ideal braking force distribution. In the embodiment example here shown, this is the case at an acceleration of 0.8 g. In the event of vehicle decelerations that are less than 0.8 g, the braking force at the rear axle increases with the braking force at the front axle according to the slope of line 30. Only at decelerations of more than 0.8 g, on account of the increasingly important dynamic distribution of the axial load to the front axle, does the braking pressure or braking force at the rear axle decrease as the braking force on the front axle decreases, which can be seen from the course of curve 27.

The loading condition of the motorcycle is constantly monitored while it runs. This can be performed, for example, by force sensors or extensometers at the wheel suspensions. Alternatively, the loading condition of the motorcycle can be estimated also by observing the locking tendency of the front wheel and rear wheel in relation to the applied brake pressure, in a known manner.

If the front wheel comes in range of "ABS control," i.e., when a lock-up tendency exists in the front wheel, it is possible by comparing the lock-up pressures at the front and rear wheel, the loading condition can be adapted. If the front wheel is in ABS control before the rear wheel, additional loading is recognized. If, however, control is applied to the rear wheel before the front wheel the estimated loading is reduced. Thus, as the run time increases, the loading condition can be successively estimated ever more accurately. Depending on the loading condition, recourse is taken to a curve 27 associated with the particular loading condition, which is deposited in the control system 5.

For the sake of completeness it is pointed out that the control of the brake force distribution between front wheel and rear wheel is "secondary" in the control hierarchy of ABS control. That is, when a lock-up tendency occurs at the front wheel and/or at the rear wheel, the braking pressure at the particular brake is always reduced by the ABS control.

One important advantage of the invention is that, in uncritical braking situations, the brake force distribution is constant. The chattering that is provoked by pulsating brake pressure limiting valves thus do not occur in uncritical braking situations.

What is claimed is:

1. A linked brake system for motorcycles, comprising:
    a front wheel brake and a rear wheel brake;
    an actuating device by which the front wheel brake and the rear wheel brake can be operated simultaneously;
    a control system for controlling brake pressures at the front wheel brake and at the rear wheel brake; and
    wheel rotational speed sensors for measuring wheel rotational speeds of the front wheel and of the rear wheel as well as for determining a reference deceleration approaching an actual vehicle deceleration and for detecting running conditions in which a locking tendency exists at at least one of the front wheel and the rear wheel, the wheel rotational speed sensors being connected to the control system,
    wherein upon an operation of the actuating device
        the control system operates the front wheel brake and the rear wheel brake with a set brake pressure ratio, provided the reference deceleration is less than a set deceleration,
        the control system controls the brake pressure ratio according to an ideal braking force distribution function between the front wheel and rear wheel whenever the reference deceleration exceeds a set critical deceleration, said ideal braking force distribution being defined by intersection loci of lines of front wheel brake force at a constant static front wheel coefficient of friction with lines of rear brake force at a constant static rear wheel coefficient of friction, said loci occurring where the front wheel brake force lines' front wheel coefficient of friction is equal to the rear wheel brake force lines' coefficient of friction.

2. The linked brake system according to claim 1, wherein a set of ideal braking force distribution functions is stored in the control system according to which the braking pressure ratio can be varied, and wherein from the set of braking force distribution functions a braking force distribution function is chosen for the control according to a loading condition of the vehicle.

3. The linked brake system according to claim 2, wherein the loading condition is estimated by monitoring the locking tendency at the front wheel and at the rear wheel, and the actual loading condition that is the basis for the control is stored in the control system.

4. The linked brake system according to claim 3, wherein the stored loading condition is considered to be too low and a correspondingly higher loading condition is applied for the continued control if, in the case of a braking action, a locking tendency occurs first on the front wheel, and wherein the stored loading condition is considered to be too high and a correspondingly lower loading condition is applied for the continued control of the brake force distribution whenever a locking tendency occurs first at the rear wheel in a braking action.

5. The linked brake system according to claim 4, further comprising an ABS control system which, when there is a locking tendency at at least one of the front wheel and the rear wheel, reduces the braking pressure at the brake in question, ABS control precedes the control of the brake pressure distribution.

6. The linked brake system according to claim 3, further comprising an ABS control system which, when there is a locking tendency at at least one of the front wheel and the rear wheel, reduces the braking pressure at the brake in question, ABS control precedes the control of the brake pressure distribution.

7. The linked brake system according to claim 2, further comprising an ABS control system which, when there is a locking tendency at at least one of the front wheel and the rear wheel, reduces the braking pressure at the brake in question, ABS control precedes the control of the brake pressure distribution.

8. The linked brake system according to claim 1, further comprising an ABS control system which, when there is a locking tendency at at least one of the front wheel and the rear wheel, reduces the braking pressure at the brake in question, ABS control precedes the control of the brake pressure distribution.

* * * * *